June 5, 1956  J. A. DRUDE  2,748,711
PRESSURE FLUID SYSTEM FOR STEERING MECHANISM AND THE LIKE
Filed Nov. 24, 1951  2 Sheets-Sheet 1
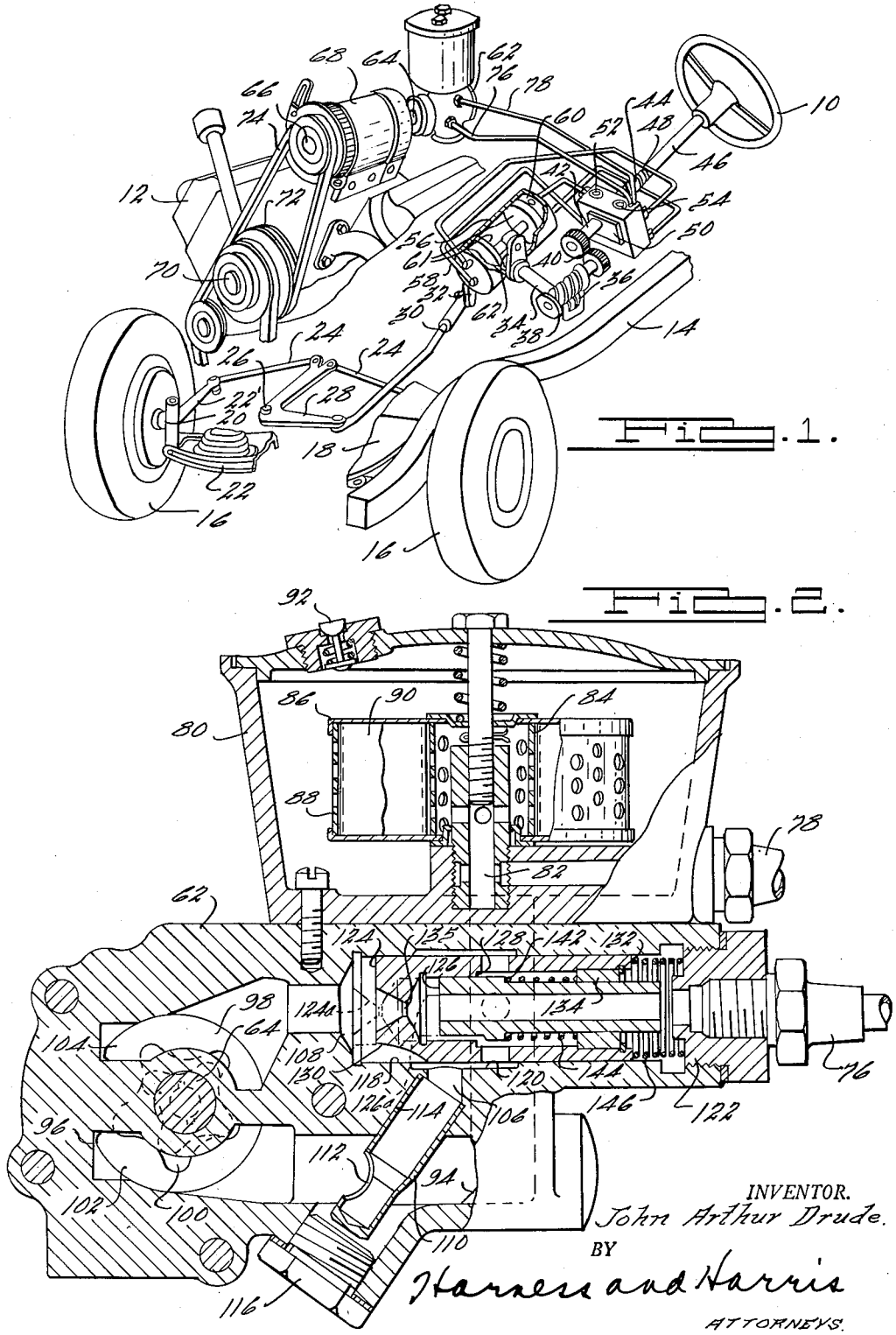
INVENTOR.
John Arthur Drude.
BY
Harness and Harris
ATTORNEYS.

June 5, 1956  J. A. DRUDE  2,748,711
PRESSURE FLUID SYSTEM FOR STEERING MECHANISM AND THE LIKE
Filed Nov. 24, 1951  2 Sheets-Sheet 2

INVENTOR.
John Arthur Drude
BY Harness and Harris
ATTORNEYS

United States Patent Office 2,748,711
Patented June 5, 1956

2,748,711

PRESSURE FLUID SYSTEM FOR STEERING MECHANISM AND THE LIKE

John Arthur Drude, Royal Oak, Mich., assignor to Chrysler Corporation, Highland Park, Mich., a corporation of Delaware Application November 24, 1951, Serial No. 258,076

17 Claims. (Cl. 103—42)

This application relates to power steering mechanism and the power fluid system combined therewith, particularly the fluid system control devices useful with steering gears and the like of the power assist type.

Power steering mechanisms are ordinarily looked on as including means for circulating pressure fluid such as oil, glycerin, or the like through a series of elements including a reservoir, a power pump for generating pressure and which draws pressure fluid from the reservoir, a power cylinder or motor which actuates the steering mechanism, and distributing means for discriminately applying the pressure to the power cylinder to actuate the steering mechanism. The pressure fluid from the steering mechanism is preferably returned to the reservoir for re-circulation. The steering mechanisms such as hereinafter described, are preferably of the "open valve" type. That is, they are so constructed that when the mechanism idles there is a free passage therethrough for the pressure fluid, or at least through the distributing means above mentioned, such that the pump works only under a sufficient load to overcome the fluid friction of the pressure fluid in the pipes and passages through which it circulates. Thus practically all the energy output of the useful fluid delivered by the pump is converted into useful work of steering when steering is being done and is not wasted in overcoming back pressure set up by a relief valve when the steering mechanism is idle. In mechanisms such as that to be described, the "open valve" distributing means provided between pump and motor, permits constant communication of the pump effective pressure to the motor and comprises two relatively movable sets of one or more valve elements. These two sets of valve elements have a normal or a neutral relative position and when so situate, no substantial fluid pressure differential is exerted which is effective on the steered member. When, however, the sets of valve elements are so moved that the two are not in their relative neutral position, the mechanism is so constructed that pressure will be built up in the pressure fluid and a force differentially exerted on the fluid motor and steered member so as to actuate the latter until such time as the sets of valve elements are restored to their neutral position.

For a comprehensive discussion of the specific open valve distributing means under consideration, reference may be had to the illustrated booklet Chrysler Power Steering, June 20, 1951, prepared and distributed by the Department of Technical Data and Information, Chrysler Corporation Engineering Division.

According to one feature of the present invention, there is provision of an improved means for controlling the pressure fluid effectively delivered from the pump to the distributing means for the steering mechanism; though the flow and pressure of the pressure fluid may fluctuate at its pumping source, the fluctuations are reduced substantially to no effect on the steering mechanism.

One object of the invention is to provide a compact arrangement of valving which as a unit accomplishes the duel function of regulating flow and pressure to limited values. In their preferred form, the respective embodiments of the valving unit of the invention each have the valving elements thereof concentrically arranged to form even greater compactness for the unit.

According to a further feature, pump horsepower is effectively conserved such that undue quantities of fluid are not needlessly circulated through the "open valve" steering mechanism; moreover, swishing and swirling noises attendant with excessive quantities of fluid circulated through the steering mechanism and its associated conduit are reduced to a minimum.

According to another feature, additional means is provided to limit the pressure in the lines attainable by fluid at all rates of flow by reason of the danger of the fluid doing damage or otherwise accomplishing undesirable results in the system.

According to still another feature of the invention, an ordinary fixed displacement pump is utilized to furnish motive fluid even though driven at speeds proportionate to fluctuating engine speeds.

According to another feature, the system tends to operate relatively quietly at advanced engine speeds and the correspondingly advanced pump speeds by virtue of the improved flow and pressure regulating apparatus provided therefor.

Further features, objects, and advantages will either be specifically pointed out or become apparent when for a better understanding of the invention, reference is made to the following written description taken in conjunction with the accompanying drawings in which:

Figure 1 is a perspective view of a vehicle to which the invention is applied;

Figure 2 is a sectional elevation of the pressure source used in Figure 1;

Figure 3:
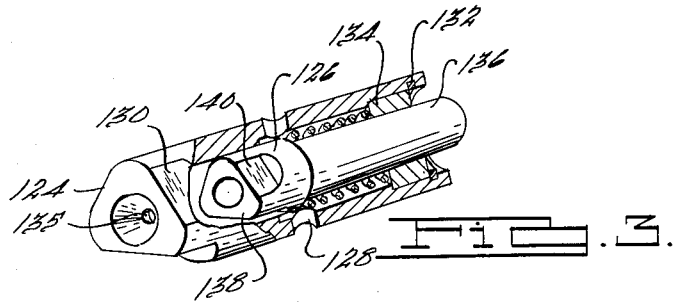
Figure 3 is a perspective view of the regulating valve used in the structure of Figure 2.

In Figure 1 of the drawings, a steered vehicle illustrative of a general type to which the invention may be applied is shown as having a steering wheel 10, a propulsion power plant 12, a body-supporting frame 14, and running gear for the vehicle including a pair of steerable front wheels 16 supported from a crossmember 18 forming a portion of the vehicle frame 14. Each of the pair of wheels 16 is incorporated in a so-called independent front suspension which is shown to include a set of one or more vertically spaced arms 22, a wheel spindle and knuckle support 20 articulatedly connected to the outer end of the arms 22, and a steering arm 22' for each front wheel 16. Each of the steering arms 22' has an inwardly directed tie rod 24 connected thereto, and the relatively inner ends of the tie rods 24 are pivotally connected to one arm of a bell crank 28 pivotally supported to swing about a pivot 26 fixed to the frame front crossmember 18. A drag link 30 is pivotally connected to the other arm of the bell crank 28 and is supported at its rear end by a pitman arm 32 splined to a transversely disposed rockshaft 34. It is through the rockshaft 34 and associated linkage just described, that the steering mechanism of the steered vehicle is connected to the pair of front wheels 16. The rockshaft 34 has a crank-like structure at one end incorporating a roller 36 which cooperates with a steering worm 38 journalled for rotation relative to the frame of the vehicle but constrained against longitudinal movement relative thereto.

A pair of pinions 40, one drivingly connected to the worm 38 and the other drivingly connected to an end of a lower piece 42 of a two-piece steering shaft, provides for manual operation of the rockshaft 34 in steering the front wheels 16 of the vehicle. The lower shaft piece 42 is mounted at its opposite end in a spherical bearing 44 which permits relative tilting of the shaft piece 42 with respect to the upper piece 46 of the two-piece steering shaft. The two shaft pieces 42, 46 are drivingly connected to one another by a flexible rubber coupling provided at 48. The upper steering shaft piece 46 is arranged such that when manually steered by the steering wheel 10, it can cause the lower shaft piece 42 to tilt upwardly and downwardly with respect to the spherical bearing 44 as a center as a result of one pinion 40 attempting to climb upwardly or downwardly relative to the worm-connected pinion 40 of the pair.

The lower shaft piece 42 is journalled within a valve-operating block 50, and the block 50 in turn constitutes a bearing which moves due to the relative tilting movement of the lower shaft piece 42. A pair of substantially vertically spaced reaction valves 52 is located on opposite sides of the valve-operating block 50 so as to be controllable thereby, and adjacent the reaction valves 52 there is located another set of substantially vertically spaced distribution valves 54 located on opposite sides of the valve-operating block 50 and likewise controlled thereby. The reaction valves 52 and the distribution valves 54 serve a fluid motor 56 comprising a pair of drawn steel steering cylinders of which the right turn cylinder is indicated at 58, and the left turn cylinder is indicated at 60. Piping is provided which, as shown, suitably connects the upper distribution valve 54 and the lower reaction valve 52 respectively, to the right turn cylinder 58. The upper distribution valve 54 in this case supplies pressure fluid to the right turn cylinder 58, and the lower reaction valve 52 serves to control the back pressure maintained in cylinder 58. Similarly, suitable piping is shown which connects the lower distribution valve 54 and the upper reaction valve 52 respectively, to the left turn cylinder 60, the function of the last-named distribution valve being to apply pressure fluid to the cylinder 60, and the function of the last-named reaction valve being to control the back pressure maintained therein.

The valve arrangement is of the so-called open valve type, it being the case that when the lower shaft piece 42 is disposed so as to cause the valve-operating block 50 to assume a neutral position, pressure fluid is being continuously circulated in a path through both distribution valves 54, through both cylinders 58, 60 respectively, and back through both reaction valves 52. The upper reaction valve 52 cooperates with the lower distribution valve 54 as previously noted to control one of the steering cylinders whereas the lower reaction valve 52 cooperates with the upper distribution valve 54 in controlling the pressure of the other cylinder. It follows then that the valve-operating block 50 is caused to translate from neutral position upwardly due to upward tilting motion of the lower shaft piece 42, the reaction valve 52 for the left turn cylinder 60 is closed to build up back pressure therein, and the distribution valve 54 of the right turn cylinder is closed so as to starve the right turn cylinder 58. Simultaneously, the lower reaction valve 52 is opened wider to permit the right turn cylinder 58 to drain whereas the lower distribution valve 54 is being opened to stimulate flow to the left turn cylinder 60.

A pair of pistons 61 is shown provided in the respective cylinders which respond to the differential pressure force of the pressure fluid, and each piston 61 carries a stud which engages an interposed roller carried by a crank arm 62. The crank arm 62 is splined to the rockshaft 34 and it serves to afford a power assist effect to the otherwise manual steering mechanism. When the rockshaft 34 moves in response to the fluid actuation of the power assist pistons 61, the pinion of the pair of pinions 40 which is connected to the worm 38, rotates and tends to cause the other pinion of the pair 40 to orbit thereabout and restore the tiltable shaft 42 and the valve-operating block 50 to neutral position. The power assist mechanism thus far described, is operated by pressure, and the pressure fluid for supplying the pressure is constantly supplied to the valving 52, 54. In neutral position, all valves 52, 54 are partially open and when any two valves from different pairs are opened to a relatively greater degree, the remaining two valves are closed by a corresponding amount. A source of pressure (and the pressures involved may be of the order 600 to 800 p. s. i. above atmosphere at times) is indicated at 62 and is positively driven by a pump shaft 64, which is flexibly coupled to a generator shaft 66 driving the rotor of a generator 68.

The propulsion power plant 12 selected for illustration in Figure 1, is a V-8 engine to which the generator 68 is mounted, and the engine includes a water pump shaft 70 which is belt-driven by the engine and has a sheave 72 keyed thereto. By means of a V-belt 74, the sheave 72 is connected to a sheave on the generator shaft 66 and thus positively drives the generator shaft and the pump shaft 64 at speeds proportionate to the engine speed. Thus as the speed of the power plant 12 varies, so varies the shaft speed of the generator 68 and also the shaft speed of the driveshaft 64 for the source of pressure 62. A supply pipe 76 supplies pressure fluid to the valving 52, 54 and a drain pipe 78 returns pressure fluid from the valving back to the source of pressure 62.

In Figures 2 and 3, the source of pressure 62 has a fluid reservoir 80 containing a vertically disposed communication 82 centrally thereof which is connected to the drain pipe 78 returning pressure fluid to the source. The vertically disposed communication 82 has openings in the upper end thereof which communicate with a chamber formed by a perforated inner cylinder 84 which cooperates with a perforated outer cylinder 88 to define a fluid filter 86. A filtering element 90 is shown within the filter 86 between cylinders and is formed of a pleated continuous length of thin-walled filter material through which all fluid must pass in progressing from the perforated inner cylinder 84 to the perforated outer cylinder 88. The arrangement of the bolt-attached reservoir 80 and the filter 86 with relation to the pressure source 62 and the supply and drain pipes 76, 78 forms no part of the present invention as such and is completely shown and described in the copending application of William A. Hunter, Serial No. 271,187, filed February 12, 1952. Briefly, however, the pressure maintained within the reservoir 80 is atmospheric, and the fluid passing through the drain 78 is forced under pressure through the filter 86 during which the pressure is reduced to atmospheric level. The reservoir 80 serves as a chamber to de-aerate the incoming fluid and has a cover at the top shown bolted thereto and including a relief valve 92 for limiting the pressure therein to atmosphere. The reservoir 80 has at the bottom thereof a vertically extending communication 94 which supplies a positive displacement rotary pump 96. The rotary pump 96 is encased to include a pair of rotors 98 eccentrically arranged one within the other the inner rotor thereof being drivingly keyed to the drive shaft 64 driven by the vehicle engine 12. The inner rotor of the pair of rotors 98 has one less than the number of teeth of the outer rotor and cooperates therewith to define included cavities 100 which serve during clockwise rotation of the pair of rotors 98 to trap and transfer individual quantities of pressure fluid from a pump supply port 102 to a pump pressure port 104.

The pressure and supply ports 104, 102 are bypassed by a bypass generally indicated at 106 and including a hollow valve chamber 108 and a fluid flow director 110. The fluid flow director 110 and its relation with the rotary pump 96 and passages connecting the valve chamber 108 and the reservoir 80 thereto, form no per se part of the present invention, being completely shown and described in the above cited copending application of William A. Hunter, Serial No. 271,187 filed February 12, 1952. Briefly, however, the fluid flow director 110 has a transverse opening 112 in the side thereof and is press fitted at 114 into the bypass 106 so as to be frictionally held there. The function of the fluid flow director 110 is to direct the relatively rapidly flowing fluid stream from the bypass into the more sluggish stream of fluid supplied through communication 94 from the reservoir and thus effectively convert the velocity head of the bypassed fluid into pressure head and better fill the pump cavities 100 so as to prevent starvation of the pump or cavitation therein.

A plug 116 is threadably received adjacent the fluid flow director 110 to provide access to the flow director. The valve chamber 108 is defined by a hollow valve case part 118 which is ported at 120 by an annular depression located at the mid section thereof and which is closed at one end by a threadably received fitting 122 to which the fluid pipe 76 is connected which supplies the valving 52 and 54. Within the hollow valve case part 118 a pair of relatively shiftable concentric hollow valve parts 124 and 126 is received. The paired valve parts 124 and 126 are shown in their open position in full lines and their respective closed positions are indicated in dotted lines at 124a and 126a. The outer valve part 124 is ported at 128 and through transversely arranged openings communicates with the port 120 in the hollow valve case part 118. The outer valve part 124 has a plurality of flats 130 provided at points in the circumference at one end, which permit the valve part 124 to uncover the adjacent port 120 when the valve part 124 is adjustably moved toward open position. The outer valve part 124 has an internal snap ring 132 which cooperates with an internal shoulder to retain a thick band 134 therewithin. The band 134 reduces the effective inside diameter of the valve part 124 at one end thereof, and at the other end of the outer valve part 124 there is incorporated a pre-calibrated orifice 135 interposed in the path of fluid flow directed to the fluid supply pipe 76.

The inner valve part 126 has a reduced end portion 136 which is slidably received by the band 134. The noted reduction of effective inside diameter of the outer valve part 124 reflects itself in that the effective end area of the reduced end 136 of the inner valve part 126 is necessarily less than the effective end area of an opposite end 138 of the inner valve part 126 adjacent orifice 135. The ends of the inner valve part 126 are essentially circular yet the end 138 having the larger diameter is provided with a plurality of flats thereupon which, while they do not reduce the effective area which may be subjected to pressure of pressure fluid, nevertheless provide a convenient means for the inner valve part 126 to uncover the valve port 128 when the inner valve part is adjustably moved toward open position with respect to the outer valve part 124. The fact that the end portion 136 is comparatively reduced relative to the other end 138 is evidenced by the appearance of a shoulder indicated at 142 on the inner valve part 126 which is engaged by resilient means 144 in the form of a coil spring which also engages the band 134 carried by the outer valve part 124 and thus effectively acts between the valve parts 124 and 126 so as always to urge the inner valve part toward closed position.

Another elastic means 146 in the form of a coil spring is provided which engages an end of the outer valve part 124 and the threaded fitting 122 carried by the valve case part 118 so as effectively to act between the hollow valve parts 124, 118 in a manner always to urge the outer valve part 126 toward closed position.

The operation of the device of Figures 1, 2, and 3 is as follows. The rotary pump 98 is driven at the varying speeds proportionate to the propulsion power plant speed 12, and as a consequence, the pressures produced thereby and the quantities of pressure fluid delivered range from a useful value to greatly excessive values. At idling speeds of the vehicle engine, the output of the pump 98 illustrated, is roughly 1.5 gallons per minute and this rate of fluid delivered is sufficient to operate the open valve steering system which includes the control valving 52, 54.

When the vehicle engine is not running or is running at sub-idling speeds, the valving in the valve chamber 108 occupies the dotted line positions 124a and 126a. Under high pressure, low flow conditions during circumstances under idling condition of the engine such as could be expected if the steered wheels of the vehicle were jammed against a curbing and could not move any farther in the direction in which they were being turned, the fluid consumption of 1.5 gallons a minute would gradually cease, and extremely high pressure conditions would be encountered. In such case, the high pressure is caused to act differentially upon the ends of the inner valve part 126 moving it from the position 126a into the full line position 126 so as to uncover the port 128 and bypass fluid through the bypass 106 from pressure port 104 back so as to be made available to suction port 102. The differential effect is created owing to the fact that the force effective at the reduced end 136 of the inner valve part 126 is insufficient even in cooperation with the force of the spring 144 to resist the force due to fluid pressure on the larger valve end 138 and hence the inner valve part 126 is forced to move to the right, as viewed in Figures 2 and 3.

Under low pressure, high flow conditions such as brought about for instance when the vehicle is under power on the straightaway at high rate of ground speed, the inner valve part assumes the dotted line position 126a closing off the port 128, and the outer valve part 124 is caused to shift to the right as viewed in Figure 2, owing to the action of the pre-calibrated orifice 135 incorporated therein. The orifice 135 is so proportioned relative to the characteristics of the spring 146, that when fluid flow therethrough exceeds 1.5 gallons per minute, a pressure drop results across the orifice which is sufficient owing to its differential action on the respective upstream and downstream ends of the outer valve part 124 to compress the spring 146 and uncover the port 120 formed in the valve case part 118. Hence under high flow conditions the outer valve part assumes the full line position shown at 124 in Figure 2.

Conditions can readily be conceived under which both valve parts either approach or fully assume the full line positions shown at 124 and 126 in Figure 2 and one such condition is that which is produced by abruptly turning the power assisted steering shaft piece 46 when the vehicle is being driven at a high rate of ground speed. Under such circumstances, the fluid flow is already in excess of 1½ gallons per minute and all the excess thereover is being bypassed through the bypass 106. Also, the inertia of the steerable wheels 16 is such as momentarily to give rise to a high back pressure transmitted back through the fluid system and sufficient to unseat the inner valve part 126 and uncover the pressure relief port 128.

Figure 4:
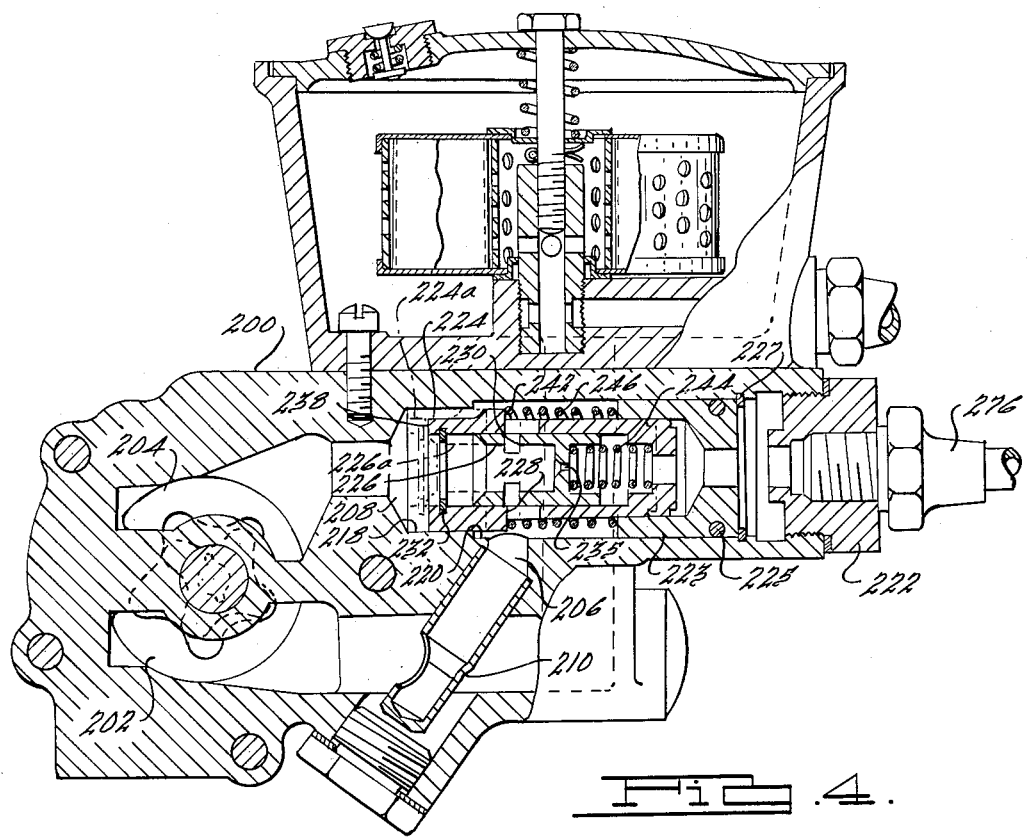
Figures 4 and 5 constitute respectively, a sectional elevation of a pressure source and a perspective view of a regulating valve forming a modified form of the invention.
Figure 5:
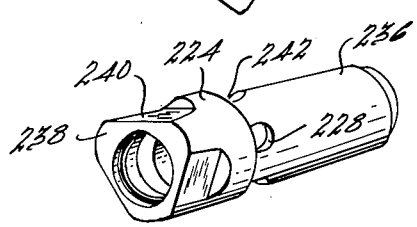

In Figures 4 and 5 a source of pressure 200 is shown which is used in the environment of Figure 1 much the same as the source 62 of Figure 2 and is similar to the latter to the extent that a pair of pump suction and pressure ports 202, 204 is provided and effectively bypassed by a bypass generally indicated at 206 and including a valve chamber 208 and a fluid flow director 210.

The valve chamber 208 is defined by a hollow valve case part 218 which, however, not only receives the relatively fixed threaded fitting 222 but also a relatively fixed part 223 which effectively reduces the inside diameter of the hollow valve case part 218. The hollow valve case part 218 is ported at 220 by an annular depression and has a snap ring 227 at one end for securing the fixed part 223 in place. The fixed part 223 is sealed by an O ring at 225. The hollow valve case part 218 contains a pair of concentric hollow valve parts 224, 226 which are relatively shiftable with respect to each other and to the valve case part 218 into closed positions indicated at dotted lines respectively at 224ª and 226ª. The outer shiftable valve part 224 is transversely ported at 228 in an intermediate section thereof and has a reduced end 236 slidably received in the noted fixed part 223 reducing the effective inside diameter of the hollow valve case part 218. The effective end area of the reduced end 236 of the outer valve part 224 is smaller than the effective end area of an opposite end 238 of the outer valve part 224. The larger end 238 of the outer valve part is provided with a plurality of flats 240 which, while they do not reduce the effective end area at 238 subjected to pressure of pressure fluid, nevertheless do provide a convenient means for the outer valve part 224 to uncover the adjacent port 220 when the valve part 224 is moved toward open position with respect to the hollow valve case part 218. The valve ends 238, 236 are of dissimilar outside diameter, as evidenced by a shoulder 242 which appears adjacent the port 220 in the hollow valve case part 218. The shoulder 242 is engaged by a resilient means 246 in the form of a coil spring which also engages the fixed part 223 and thus effectively acts between the valve case part 218 and the outer valve part 224 so as constantly to urge the valve part 224 into its fully closed position indicated at 224ª. The outer valve part 224 incorporates a snap ring 232 which serves as a stop for the inner valve part 226 when the latter is in its closed position indicated at 226ª. The inner valve part 226 is formed with a plurality of circumferential slots through the sides thereof which register with the port 228 in the outer valve part so as to uncover the latter when the inner valve part 226 is in the relatively open position shown in full lines in Figure 4.

The inner valve part 226 incorporates a pre-calibrated orifice 235 which is interposed in the path of fluid flow directed to a fluid supply pipe 276 for such control valving as is shown in Figure 1 at 52, 54. A resilient means 244 in the form of a coil spring is received at its respective ends in opposed recesses formed in the inner valve part 226 and in the outer valve part 224 so as effectively to act between the same for continuously urging the inner valve part into the closed position indicated at 226ª in which the port 228 is covered.

The operation of the embodiment of Figures 4 and 5 is substantially the same as for the first embodiment described but with one possible exception later to be described. Thus, as the flow rate reaches and exceeds 1½ gallons per minute in the stream of fluid going to the supply duct 276, the interposed pre-calibrated orifice 235 produces a sufficient pressure drop thereacross acting differentially on the ends of the inner valve part 226 to force it into open position and overcome the yieldable opposition of the spring 244. Under conditions of excessive pressure in the system, the outer valve part 224 having the dissimilar ends 236, 238 is caused by the differential action of the pressure at both ends to be moved against spring 246 into the open position shown in full lines at 224 in which the port 220 is uncovered. Under conditions of high pressure and high flow which were discussed in a previous connection with the preferred embodiment of Figures 2 and 3, the inner valve part 226 which carries the orifice 235 is forced into open position owing to the differential of pressures, and the outer valve part 224 is forced into open position owing to the differential of areas. The exception above named between the preferred embodiment of Figures 2, 3 and the embodiment of Figures 4, 5 under discussion is that the outer valve part 124 in the former embodiment handles the larger flow as it were, which flow is in excess of 1½ gallons a minute and is somewhat better adapted and suited for the larger volume by virtue of being the relatively larger valve of the two valve parts 124 and 126. That is to say, a larger valve is a better expedient in handling larger quantities of flow by virtue of the fact that relatively larger areas of port to be uncovered are available to a relatively larger valve, all other things being equal. The quantities of fluid to be bypassed due to excessive pressures in the system are of a minor consequence compared to the quantities necessarily bypassed due to excessive rate of flow. This fact is explained due to the conditions of operation in service for power assist steering mechanisms.

As herein disclosed, the invention is shown embodied in a pressure fluid system of the open valve type in which the pressure fluid is continuously being circulated not only to the distributing means but also is being continuously circulated on past the distributing means and through the power motor. It is evident that the invention will be equally effective in pressure fluid systems of the open valve type in which there is continuous communication between the distributing means and the power motor and between the distributing means and the source of pressure but in which the circulation is effective at all times only between the distributing means and the pressure source. So also in the respective embodiments, the drawing shows one of the two shiftable valve parts to have ends of dissimilar effective area whereas the calibrated orifice is incorporated on a different one of the two shiftable valve parts, but indeed, it is not essential to the invention that the orifice be incorporated on a different valve part and within the broader aspects of the invention a particular one of the two valve parts may both have the dissimilar ends and also incorporate the orifice in the structure thereof. The pump casing incorporates a rotary pump as well as incorporating two shiftable valve parts which are concentric to one another but self-evidently a positive displacement pump of the spur or helical gear type or else a vane-type pump may be equally well employed to advantage, and the two valve parts concerned can conceivably be located in a valve chamber which is external to the pump casing and disposed between the pump casing and the distributing means. In the claims, oil, glycerin, and the like liquids are not only comprehended by the term "fluid" but also other suitable fluids not necessarily confined to the liquid state.

Variations within the spirit and scope of the invention described are equally comprehended by the foregoing description.

What is claimed is:

1. In a pump having pressure and suction ports and communication between the ports: a valve chamber included in said communication, valve biasing means, said valve chamber containing shiftable valve parts one within another with an annular space between and receiving said valve biasing means, at least one of said valve parts having ends of unequal diameter so as to afford end surfaces of unequal effective area when acted upon by pressure fluid, orifice means carried by one of said valve parts in a manner such as to be movable therewith and interposed in the path of fluid flow in said communication, the outer valve part having a valve surface portion slidable with respect to a companion valve surface portion on each of said inner valve part and said valve chamber, and an opening in the side of said outer valve part connected by said communication to said pump suction port, the respective valve surface portions incorporated between said valve chamber and said outer valve part establishing cooperation upon relative shift between the same to pass fluid to said pump suction port in response to the force unbalance produced in the valve due to the action of the pressure of fluid on the unequal effective end areas of the said valve part ends, the respective valve surface portions incorporated between said inner valve part and said outer valve part establishing cooperation upon relative shift between the same to pass fluid to the said opening in the side of the outer valve part connected to said pump suction port in response to the force unbalance produced in the valve due to unequal fluid pressures caused by the orifice means.

2. In an hydraulic pressure fluid system, a pumping means having a delivery conduit and a supply conduit, bypassed communication between said delivery conduit and said supply conduit, and valving included in said communication to control the bypass flow, said valving being formed of a pair of hollow valve parts received by a third hollow valve part and arranged one within another, a plurality of biasing means acting between different ones of said valve parts to oppose movement of the valve parts out of closed position, the parts being relatively reciprocative and the outer part of the pair of parts having a port in the wall thereof along the line of reciprocation of the inner of the pair of parts, and the third part having a port in the wall thereof along the line of reciprocation of the outer part of said pair of valve parts, the outer of the valve parts of said pair having the opposite ends thereof of dissimilar diameter so as to present dissimilar areas of end surface exposed to fluid pressure and thus move in response to excessive pressure build-up to uncover the port along the corresponding path of reciprocation thereof, and orifice means interposed in said communication in the path of fluid flow and carried by at least the inner of said pair of valve parts so as to uncover the port along the corresponding path of reciprocation thereof in response to a predetermined pressure drop across said orifice means due to predetermined rate of flow of fluid therethrough, said ports being connected to said bypass for bypassing fluid to limit the maximum flow rate and pressure of the fluid traversing the system through said communication as a result of the pumping action of said pumping means.

3. In a fluid pumping device of the character described, a pumping chamber, a fluid delivery conduit and a fluid supply conduit communicating with said pumping chamber, a bypass between said delivery conduit and said supply conduit, a pressure sensitive control-valving-assembly having portions disposed within said bypass, said valving assembly being effective to bypass a portion of the fluid passing through said delivery conduit, said valving-assembly including pre-calibrated orifice means carried thereby and being formed of hollow relatively reciprocal valve parts including an intermediate valve part concentrically arranged both in surrounded and surrounding relationship to other ones of said valve parts with intervening ports between in line of reciprocation of each surrounded reciprocal part, elastic means acting between different ones of said valve parts to oppose the uncovering of the ports due to reciprocation by the corresponding said surrounded valve part, said pre-calibrated orifice means being interposed in the stream of pressure fluid passing through said delivery conduit to produce a pressure differential effective in said pressure sensitive control-valving-assembly to cause shift of said intermediate valve part adjustably to uncover the port in line of reciprocation thereof and limit the flow rate of pressure fluid through the orifice means to a maximum in accordance with the pressure differential produced, there being a difference in the diameters of the ends of the valve part surrounded by said intermediate valve part so as to present end surfaces of different effective end areas exposed to fluid pressure and acted thereupon to move the just-named valve part and adjustably uncover the port in line of reciprocation thereof to limit the fluid in said delivery conduit.

4. In a fluid pumping device of the character described, a pumping chamber, a fluid delivery conduit and a fluid supply conduit communicating with said pumping chamber, a bypass between said delivery conduit and said supply conduit, a pressure sensitive control-valving-assembly having portions disposed within said bypass, said valving assembly being effective to bypass a portion of the fluid passing through said delivery conduit, said valving-assembly including pre-calibrated orifice means carried thereby and being formed of hollow relatively reciprocal valve parts including an intermediate valve part concentrically arranged both in surrounded and surrounding relationship to other ones of said valve parts with intervening ports between in line of reciprocation of each surrounded reciprocal part, elastic means acting between different ones of said valve parts to oppose the uncovering of the ports due to reciprocation by the corresponding said surrounded valve part, said pre-calibrated orifice means being interposed in the stream of pressure fluid passing through said delivery conduit and rigidly connected for movement with the intermediate valve part to produce a pressure differential effective to cause shift of said intermediate valve part adjustably to uncover the port in line of reciprocation thereof and limit the flow rate of pressure fluid through the orifice means to a maximum in accordance with the pressure differential produced, there being a difference in the size of the ends of the valve part surrounded by said intermediate valve part so as to present end surfaces of different effective end areas exposed to fluid pressure and acted thereupon to move the just-named valve part and adjustably uncover the port in line of reciprocation thereof to limit the fluid pressure in said delivery conduit.

5. A fluid pumping device comprising a fuel delivery conduit for accommodating the flow of a pressure fluid stream, valve means including a first valve part movable from a closed position to uncover a valve port and to divert a portion of said pressure fluid stream, a second valve part movable with said first valve part and also capable of limited movement relative thereto from a closed position to uncover another valve port and to divert a portion of said pressure fluid stream, said second valve part incorporating an orifice interposed in said stream of pressure fluid for creating a pressure differential effective to cause movement of at least one of said valve parts to uncover one of the two-said valve ports, the first valve part having its ends formed with a difference in areas respectively exposed to the pressure of the fluid so as to be responsive to the magnitude of the fluid pressure by moving to uncover the other of the two said ports and to divert a portion of said pressure fluid stream, and yielding means effective to restore said valve parts to their closed position when displaced therefrom.

6. A fluid pumping device comprising a flow delivery conduit for accommodating the flow of a pressure fluid stream, valve means including a first valve part movable from a closed position to uncover a first valve port and to divert a portion of said pressure fluid stream, a second valve part movable with said first valve part and also capable of limited movement relative thereto from a closed position to uncover a second valve port and to divert a portion of said pressure fluid stream, said second valve part incorporating an orifice interposed in said stream of pressure fluid for creating a pressure differential effective to cause movement of said second valve part to uncover one of the two said valve ports, said first valve part having its ends formed with a difference in areas respectively exposed to the pressure of the fluid so as to be responsive to magnitude of fluid pressure by moving to uncover said first port and to divert a portion of said pressure fluid stream, and yielding means effective to restore said valve parts to their closed position when displaced therefrom.

7. In a control valve construction having inlet and outlet passages for pressure fluid and an interposed chamber means through which a fluid flow path leads from one passage to the other, a compound valve assembly movable within the chamber means and cooperating therewith to form first and second controlled passages connected to another outlet spaced apart with respect to the inlet and outlet passages, said compound assembly including a pressure-differential-producing orifice interposed in the fluid flow path within the chamber means and comprising telescopically related hollow valves, the inner one controllably covering said first passage and being pressure movable for progressively opening the same in response to the flow pressure differential produced by said orifice, and the other valve controllably covering the second passage and having a set of opposite ends thereon which present a difference in areas exposed to fluid pressure for forcing the valve to move under pressure to open the second passage.

8. For use with a pump having pressure and suction ports, there being a direct means of communication between the ports, a valve chamber included in said means of communication, valve biasing means, said valve chamber containing shiftable hollow valve parts one within another with an annular space between and receiving said valve biasing means, at least one of said valve parts having ends of unequal diameter so as to afford end surfaces of unequal effective area when acted upon by pressure fluid, the outer valve part being disposed lengthwise of said valve chamber with the head end upstream, said outer valve part being provided with flats at points in the circumference of the head end and also being provided with internal surfaces slidable with said part with respect to companion valve surface portions on the respective said valve chamber and the inner valve part, orifice means incorporated in the outer valve part adjacent the head end thereof and interposed in the path for fluid flow in said means of communication and an opening formed in said outer valve part in spaced apart relationship to said orifice means and connected by said means of communication to said pump suction port, said orifice means causing a pressure drop in the flow path and preventing pressure on the head end from acting on the inner valve part and from equalling interior and downstream pressures which are the same, during flow conditions, the respective flats and companion valve surface portion between said outer valve part and said valve chamber establishing cooperation upon relative shift between the same to pass fluid to said pump suction port in response to the force unbalance produced in the valve due to unequal fluid pressures caused by the orifice means, the respective valve surface portion and internal surface incorporated between said inner valve part and said outer valve part establishing cooperation upon relative shift between the same to pass fluid to the said opening in the side of the outer valve part connected to said pump suction port in response to the force unbalance produced in the valve due to the action of the pressure of fluid on the unequal effective end areas of said valve part ends.

9. For use with a pump having pressure and suction ports, there being a direct means of communication between the ports, a valve chamber included in said means of communication, valve biasing means, said valve chamber containing shiftable hollow valve parts one within another with an annular space between and receiving said valve biasing means, at least one of said valve parts having ends of unequal diameter so as to afford end surfaces of unequal effective area when acted upon by pressure fluid, the outer valve part being disposed lengthwise of said valve chamber with the head end upstream and being pressure movable therein so as to shift downstream, said outer valve part being provided with valve surface portions slidable with respect to a companion valve surface portion on each of the respective said valve chamber and the inner valve part, orifice means incorporated in the outer valve part adjacent the head end thereof and interposed in the path for fluid flow in said means of communication and an opening formed in said outer valve part in spaced apart relationship to said orifice means and connected by said means of communication to said pump suction port, said orifice means causing a pressure drop in the flow path and preventing pressure on the head end from acting on the inner valve part and from equalling interior and downstream pressures which are the same, during flow conditions, the respective valve surface portions between said outer valve part and said valve chamber establishing cooperation upon relative shift between the same, to pass fluid to said pump suction port in response to the force unbalance produced in the valve due to unequal fluid pressures caused by the orifice means, the respective valve surface portions incorporated between said inner valve part, and said outer valve part establishing cooperation upon relative shift between the same to pass fluid to the said opening in the side of the outer valve part connected to said pump suction port in response to the force unbalance produced in the valve due to the action of the pressure of fluid on the unequal effective end areas of said valve part ends.

10. In a rotary pump, a housing having a rotor chamber therein, rotor means operable in said rotor chamber and defining variable pumping chambers, said housing also having intake and discharge ports therein adapted respectively to supply intake fluid to and receive pumped fluid from said pumping chambers, portions of said housing defining a valve chamber having an internal annular first valve seat therein and having communication with said intake and discharge ports on opposite sides of said valve seat, means defining a delivery passage for the external delivery of pumped fluid from said discharge port, fluid pressure differential responsive valve plunger means operable in said valve chamber and comprising a hollow valve plunger cooperating with said first valve seat and itself having an internal annular second valve seat therein and a second valve plunger movable in said hollow valve plunger and cooperating with said second valve seat, and spring means effective on said valve plungers and urging the same toward their closed positions, said valve plunger means being effective to bypass pumped fluid from said discharge port to said intake port for automatically maintaining the pumped fluid in said delivery passage substantially at desired volume and pressure values, said hollow valve plunger having a permanently open flow control orifice therein and said second valve plunger having a connecting passage extending therethrough, and said delivery passage being connected with said discharge port through said orifice and said connecting passage.

11. In a rotary pump, a housing having a rotor chamber therein and a pair of intake and discharge ports communicating with said rotor chamber, rotor means operable in said rotor chamber defining pumping chambers therein for producing a pumping action, portions of said housing defining a substantially cylindrical valve chamber having an annular first valve seat therein, said discharge port being in communication with said valve chamber at one side of said first valve seat and said intake port being in communication with said valve chamber at the other side of said first valve seat, the outer end portion of said valve chamber forming a delivery passage for the external delivery of fluid from the pump, a hollow valve member slidable in said valve chamber cooperating with said first valve seat, spring means effective on said hollow member for urging the same toward a closed position relative to said first valve seat, said hollow valve member having therein a second valve seat and also having a bypass port therein adjacent said second valve seat communicating with said intake port, a second valve member movable in said hollow valve member cooperating with said second valve seat for controlling said bypass port, and spring means effective on said second valve member for urging the same toward a closed position relative to said second valve seat, said hollow valve member and said second valve member constituting a bypass valve means operable to bypass fluid from said discharge port to said intake port for automatically maintaining the fluid delivery in said delivery passage substantially at desired volume and pressure values, said hollow valve member having a permanently open flow control orifice therein and said second valve member having a connecting passage therein, and said delivery passage being connected with said discharge port through said orifice and said connecting passage.

12. A fluid pump comprising a pump chamber, a high pressure conduit means communicating with said chamber for accommodating the delivery of pressurized fluid from said chamber, a low pressure conduit means communicating with said chamber for supplying said chamber with working fluid, a bypass passage extending between said high pressure conduit means and said low pressure conduit means for accommodating the flow through said high pressure conduit means in excess of a predetermined amount, valve means including portions forming an adjustable restriction with respect to said bypass passage, said valve means being comprised of relatively movable and concentrically disposed hollow valve parts, separate biasing means acting on each of said valve parts for normally biasing the latter to increase the degree of said restriction and to block said bypass passage, one of said valve parts having ends of unequal diameter, said one valve part being adapted to shift relative to said bypass passage upon an increase in pressure within said high pressure passage beyond a predetermined value thereby opening said bypass passage and decreasing said restriction, and a precalibrated orifice means formed in the other of said valve parts, said orifice means forming a portion of said high pressure passage means, said orifice means being effective to create a pressure differential thereacross which is capable of shifting said other valve part relative to said bypass passage, said other valve part being adapted to limit the effective rate of delivery of fluid through said high pressure passage means to a predetermined value and said one valve part being adapted to limit the magnitude of the fluid pressure in said high pressure passage means to a predetermined value.

13. A fluid pump comprising a pump chamber, a supply conduit and a delivery conduit communicating with said pump chamber, a bypass passage interconnecting said supply and delivery conduits, valve means including portions forming an adjustable restriction with respect to said bypass passage, said valve means being comprised of relatively movable valve parts, one of said valve parts being movable within the other, a separate biasing means for each of said valve parts for shifting the same to increase the degree of said restriction and to block said bypass passage, one of said valve parts having end surfaces of unequal diameter, said one valve part being adapted to shift relative to said bypass passage upon an increase in pressure within said high pressure passage beyond a predetermined value thereby opening said bypass passage and decreasing said restriction, and a precalibrated orifice means formed in the other of said valve parts, said orifice means forming a portion of said delivery conduit, said orifice means being effective to create a pressure differential thereacross which is capable of shifting said other valve part relative to said bypass passage, said other valve part being adapted to limit the effective rate of delivery of fluid through said delivery conduit to a predetermined value and said one valve part being adapted to limit the magnitude of the fluid pressure in said high pressure passage means to a predetermined value.

14. A fluid pumping unit comprising a fluid delivery conduit means and a fluid supply conduit means, a bypass between said delivery and said supply conduits, valve means including two relatively movable valve parts forming an adjustable restriction in said bypass, one of said valve parts being slidably disposed within the other, means for biasing each of said valve parts so as to normally restrict said bypass, a first of said valve parts having ends of unequal diameter thereby causing said one valve part to shift and to reduce the degree of restriction of said bypass upon an increase in fluid pressure within said delivery conduit means, a precalibrated orifice formed in the second of said valve parts for accommodating a predetermined rate of flow of fluid within said delivery conduit means, said orifice creating a pressure differential across said second valve part to cause the same to shift thereby reducing the degree of restriction of said bypass and causing the flow of fluid in said delivery conduit means in excess of said predetermined rate to bypass into said supply conduit means.

15. The combination as set forth in claim 14 wherein said first and said second valve parts are concentrically disposed and wherein said orifice means is disposed in the effective output delivery path for the fluid flowing in said delivery conduit means, said first and second valve parts having cooperating valve surfaces adapted to control the degree of restriction of said bypass upon relative movement therebetween, said relative movement being produced by reason of the pressure differential across said orifice.

16. A combined flow control and pressure relief valve means for use with a fluid system, said system having a fluid delivery conduit and a branch passage communicating with said delivery conduit, portions of said valve means being disposed in said delivery conduit, said valve means including two relatively movable valve elements, valve surfaces formed in each of said valve elements for progressively restricting said branch passage, one of said valve elements being provided with a flow restricting orifice, said orifice being disposed in said delivery conduit and adapted to create a pressure drop across said one valve element, said one valve element being adapted to shift relative to said branch passage and to reduce the restriction in the latter as said pressure drop increases in magnitude beyond a predetermined value, the other valve element being formed with opposed surfaces of unequal area, said areas being exposed to fluid pressure in said delivery conduit and said other valve element being shifted relative to said branch passage to reduce the restriction in the latter as the delivery conduit pressure exceeds a predetermined value.

17. A combined flow control and pressure relief valve means for use with a fluid system, said system having a fluid delivery conduit and a branch passage communicating with said delivery conduit, portions of said valve means being disposed in said delivery conduit, said valve means including two independently movable and telescopically related valve elements, a valve port in the outer valve element communicating with and forming a portion of said branch passage, a valve surface formed on the inner valve element for progressively restricting said branch passage upon movement of said inner valve element relative to said port, a valve surface formed on the outer valve element for progressively restricting said branch passage upon movement of said outer valve element relative to said branch passage, one of said valve elements being formed with opposed surfaces of unequal area to adapt the same to shift toward a branch passage restricting position upon a decrease in the fluid pressure in said delivery conduit, and an orifice means formed in the other of said valve elements for producing a pressure differential thereacross, said pressure differential being effective to shift said other valve element toward a branch passage restricting position upon a decrease in the rate of flow of fluid through said delivery conduit.

References Cited in the file of this patent
UNITED STATES PATENTS

| | | |
|---|---|---|
| 839,331 | Stevens | Dec. 25, 1906 |
| 1,454,396 | MacDonald | May 8, 1923 |
| 2,070,411 | Powers | Feb. 9, 1937 |
| 2,123,815 | Tweddell | July 12, 1938 |
| 2,193,075 | Osborne | Mar. 12, 1940 |
| 2,274,734 | Esnault-Pelterie | Mar. 3, 1942 |
| 2,343,752 | Curtis | Mar. 7, 1944 |
| 2,404,102 | Schultz | July 16, 1946 |
| 2,437,791 | Roth et al. | Mar. 16, 1948 |